United States Patent
Lee et al.

(10) Patent No.: US 8,284,831 B2
(45) Date of Patent: Oct. 9, 2012

(54) PULSE SHAPING METHOD

(75) Inventors: Seung Joon Lee, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 406 days.

(21) Appl. No.: 12/566,959

(22) Filed: Sep. 25, 2009

(65) Prior Publication Data

US 2010/0128776 A1 May 27, 2010

(30) Foreign Application Priority Data

Nov. 24, 2008 (KR) .................. 10-2008-0117084

(51) Int. Cl.
- *H03K 9/04* (2006.01)
- *H03K 7/08* (2006.01)
- *H04B 1/66* (2006.01)

(52) U.S. Cl. ......... 375/239; 375/238; 375/316; 375/295

(58) Field of Classification Search .............. 455/39, 455/500, 501, 63.1, 70, 71, 73, 88, 114.2; 370/204, 205, 208, 286, 289, 290, 317, 318, 370/480, 482, 488; 379/406.01, 406.05, 379/406.06, 406.08; 375/278, 284, 285, 375/275–276, 295, 296, 316, 321, 326, 338, 375/339, 350, 211, 219, 213, 220, 222, 224, 375/239, 238, 237, 240.27–240.29, 242, 375/254, 256, 324, 346
See application file for complete search history.

(56) References Cited

U.S. PATENT DOCUMENTS

| | | | | |
|---|---|---|---|---|
| 7,688,888 B2 * | 3/2010 | Brown et al. | ................. | 375/232 |
| 2006/0140249 A1 | 6/2006 | Kohno | | |
| 2008/0117805 A1 * | 5/2008 | Azadet | ......................... | 370/201 |

FOREIGN PATENT DOCUMENTS

JP 3785542 B2 6/2006

OTHER PUBLICATIONS

Assalini, Antonio et al., "Improved Nyquist Pulses," *IEEE Communications Letters*, vol. 8(2):87-89 (2004).
Beaulieu, Norman C. et al., "Parametric Construction on Nyquist-I Pulses," *IEEE Transactions on Communications*, vol. 52(12):2134-2142 (2005).
Chandan, S. et al., "A Family of ISI-Free Polynomial Pulses," *IEEE Communications Letters*, vol. 9(6):496-498 (2005).
Franks, L.E. et al., "Further Results on Nyquist's Problem in Pulse Transmission," *IEEE Transactions on Communication Technology*, vol. 16(2):337-340 (1968).
Lee, Seung Joon et al., "Design of Time-Limited Pulses," *IEEE Communications Letters*, vol. 13(8):573-575 (2009).

\* cited by examiner

*Primary Examiner* — Sam K Ahn
*Assistant Examiner* — Linda Wong
(74) *Attorney, Agent, or Firm* — Niles Mullins Riley & Scarborough LLP; EuiHoon Lee, Esq.

(57) ABSTRACT

Provided is a pulse shaping method. A time interval is predefined so as to shape a pulse used for a transmit pulse and a receive filter response, a parameter is generated by using a weight coefficient and a plurality of cosine functions that are multiplied and added to be output during the predetermined time interval, and 0 is output during another interval, thereby shaping the pulse. The weight coefficient is updated by using the normalized MSE so as to shape the pulse to be optimized for the predetermined time interval.

3 Claims, 2 Drawing Sheets

PULSE SHAPING METHOD

CROSS-REFERENCE TO RELATED APPLICATION

This application claims priority to and the benefit of Korean Patent Application No. 10-2008-0117084 filed in the Korean Intellectual Property Office on Nov. 24, 2008, the entire contents of which are incorporated herein by reference.

BACKGROUND OF THE INVENTION (a) Field of the Invention

The present invention relates to a pulse shaping method. Particularly, the present invention relates to a pulse shaping method with a finite time interval.

(b) Description of the Related Art

In general, a communication system uses a band-limited pulse so as to control the bandwidth of transmitted signals. The band-limited pulse, generally referred to as a Nyquist pulse, controls a signal that has a finite bandwidth and that is sampled by accurate symbol timing to not have inter-symbol interference (ISI). The most widely used Nyquist pulse is the raised-cosine (RC) pulse.

However, the Nyquist pulse is not the only one. That is, other types of Nyquist pulses as well as the RC pulse can exist. The Nyquist pulse has no ISI when symbol timing is accurate, and the Nyquist pulse has ISI when the symbol timing has an error. Recently, pulses with ISI of less than the RC pulse while having a symbol timing error have been proposed.

Since the Nyquist pulse has a finite bandwidth, the length of the pulse in the time domain becomes infinite. However, it is impossible for the actual transmitting/receiving system to realize a pulse with an infinite length in the time domain. Generally, in the communication system, the Nyquist pulse is divided into a transmit pulse and a receive filter response, and the transmit pulse and the receive filter response are cut to a predetermined length to be used in the time domain. That is, in further detail, a pulse with a finite time interval used in a real communication system is no longer a Nyquist pulse.

Relative performance of the pulses is variable by the length of the time domain. That is, the pulse A outperforms the pulse B in consideration of a long pulse existing interval (the transmit pulse and the receive filter response are cut so that they may maintain the long interval in the time domain), and the pulse A may have worse performance than the pulse B when they are cut more shortly (i.e., the transmit pulse and the receive filter response of each pulse are cut to maintain short intervals in the time domain).

Therefore, the conventional method of cutting, in the time domain, the square-root Nyquist pulse (its square root becomes the Nyquist pulse in the frequency domain) which is infinitely long in the time domain and using the same may not maintain relatively better performance in the case of the Nyquist pulse. That is, the cutting of the pulse in the time domain cannot guarantee relatively better performance of the original pulse.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a pulse shaping method that is optimized for a predetermined time domain of a transmit pulse and a receive filter response.

An exemplary embodiment of the present invention provides a method for shaping a pulse used as a transmit pulse and a receive filter response, including: setting a first time interval for shaping a pulse; and outputting a pulse with a first value, which is generated by multiplying a first parameter generated based on a weight coefficient by each of a plurality of cosine functions with different periods and summing them, in the first time interval, and outputting a pulse with a second value in a second time interval other than the first time interval.

DETAILED DESCRIPTION OF THE EMBODIMENTS

Figure 1:
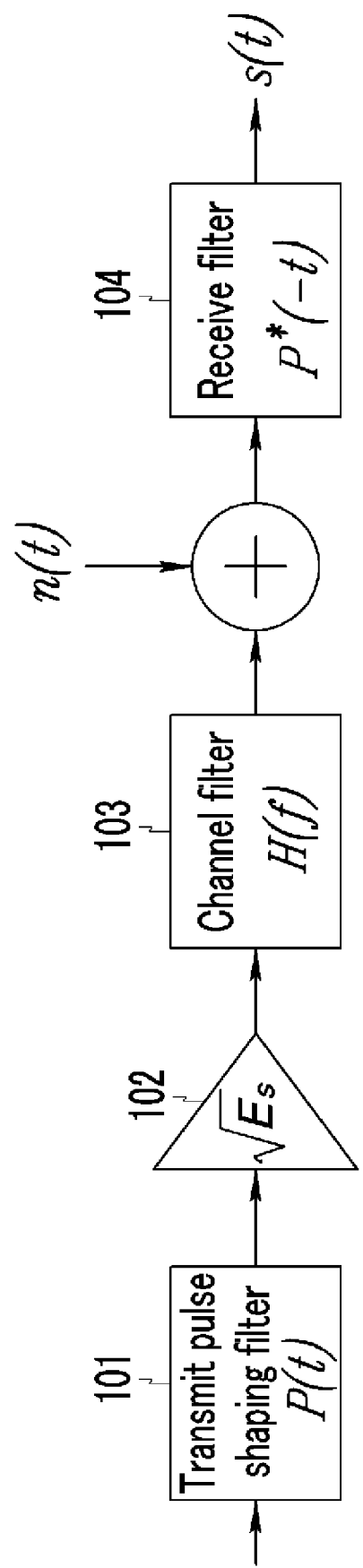
FIG. 1 shows a configuration diagram of a transmitting/receiving system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

A pulse shaping method according to an exemplary embodiment of the present invention will now be described with reference to accompanying drawings.

FIG. 1 shows a configuration diagram of a transmitting/receiving system according to an exemplary embodiment of the present invention.

Referring to FIG. 1, the transmitting/receiving system includes a transmit pulse shaping filter 101, an amplifier 102, a channelization filter 103, and a receive filter 104.

The transmit pulse shaping filter 101 shapes a transmit pulse (p(t)) based on the time interval as expressed in Equation 1.

$$p(t) = \begin{cases} \sum_{k=0}^{K} v_k \cos\left(\frac{2\pi kt}{LT}\right), & -\frac{LT}{2} \leq t \leq \frac{LT}{2} \\ 0, & \text{elsewhere} \end{cases} \quad \text{(Equation 1)}$$

Here, T represents a symbol interval, and the time interval ([−LT/2, LT/2]) includes L symbols with the symbol interval T. Also, K represents the number of cosine pulses k≠0 with a frequency other than 0 for configuring the transmit pulse (p(t)), and $v_k$ indicates a parameter multiplied by the cosine pulse configuring the transmit pulse (p(t)).

That is, in Equation 1, the transmit pulse (p(t)) is acquired by multiplying K+1 (including the case of k=0) cosine functions $$\left(\cos\left(\frac{2\pi k t}{LT}\right)\right)$$

with different periods (LT/k) by $v_k$ and summing them within a predetermined time interval, and it becomes the pulse of 0 in a time interval other than the time interval. Here, if K is great, it is possible to precisely design the transmit pulse, and the number of $v_k$ to be optimized is increased to increase complexity. Therefore, the values that are optimal in the predetermined time interval are selected for the parameters K and $v_k$ in consideration of the characteristics. Many methods for determining K are allowable. K is assumed to be a randomly given value in the exemplary embodiment of the present invention.

When K is a random value, Equation 1 can be expressed as Equation 2.

$$p(t) = \begin{cases} \frac{1}{\sqrt{K_{x(t)}}} x(t), & |t| \leq \frac{LT}{2} \\ 0, & \text{elsewhere} \end{cases} \quad \text{(Equation 2)}$$

$$x(t) = \sum_{k=0}^{K} w_k \cos\left(\frac{2\pi k t}{LT}\right)$$

$$K_{x(t)} = \int_{-\frac{LT}{2}}^{\frac{LT}{2}} |x(t)|^2 \, dt.$$

It can be given that $v_k = w_k/\sqrt{K_{x(t)}}$ from Equation 2. Here, $K_{x(t)}$ represents a function acquired by multiplying a plurality of cosine functions configuring the transmit pulse (p(t)), that is, the K+1 cosine functions $$\left(\cos\left(\frac{2\pi k t}{LT}\right)\right)$$

with different periods (LT/k) by corresponding weight coefficients $w_k$, summing them to generate a value, squaring the value x(t), and integrating the squared value for a predetermined time interval ([−LT/2, LT/2]).

The value x(t) of Equation 2 can be Fourier transformed as expressed in Equation 3.

$$X(f) = \int_{-LT/2}^{LT/2} x(t) e^{-j2\pi f t} dt \quad \text{(Equation 3)}$$

$$= \sum_{k=0}^{K} w_k \frac{(-1)^k f L^2 T^2 \sin(\pi f L T)}{\pi (f^2 L^2 T^2 - k^2)}$$

Assuming that the function (p(t)) of Equation 1 is used for the transmit pulse and the receive filter response, and the transmit pulse (p(t)) generated by the transmit pulse shaping filter 101 is amplified to have the symbol energy $E_s$ by the amplifier 102, the Fourier transformation of the received signal when a transmit pulse is transmitted, that is, the receive signal s(t) after the transmit pulse with the symbol energy $E_s$ has passed through the channel filter 103 and the receive filter 104 generates a signal $S(f) = \sqrt{E_s} H(f) X^2(f)/K_{x(t)}$. The receive signal r(t) output by the receive filter 104 when the symbol-multiplied transmit pulses are sequentially transmitted, it can be expressed as Equation 4.

$$r(t) = \sum_{m=-\infty}^{\infty} a_m s(t - mT) \quad \text{(Equation 4)}$$

Here, $a_m$ represents a transmit symbol having a complex number, and the average energy of the transmit symbol is given to be $E[|\alpha_m|^2] = 1$ in the exemplary embodiment of the present invention. Accordingly, when the error of the symbol timing is $\epsilon$, the mean squares error (MSE) of the receive symbol can be expressed as Equation 5.

$$MSE\left(\frac{\epsilon}{T}\right) \triangleq E\left[|r(\epsilon) - \sqrt{E_s}\, a_0|^2\right] \quad \text{(Equation 5)}$$

$$= \sum_{m=-\infty}^{\infty} s^2(\epsilon - mT) + E_s - 2\sqrt{E_s}\, s(\epsilon)$$

Further, the normalized MSE of the receive symbol can be expressed as Equation 6 after dividing Equation 5 by the symbol energy ($E_s$).

$$J(w_0, w_1, \ldots, w_K) \triangleq \quad \text{(Equation 6)}$$

$$MSE\left(\frac{\epsilon}{T}\right) / E_s = \frac{1}{T^2 K_{x(t)}^2} \int_{-\frac{1+\alpha}{2}}^{\frac{1+\alpha}{2}} X^4\left(\frac{f}{T}\right) df +$$

$$\frac{4}{T^2 K_{x(t)}^2} \cos\left(2\pi \frac{\epsilon}{T}\right) \int_{\frac{1-\alpha}{2}}^{\frac{1}{2}} X^2\left(\frac{f}{T}\right) X^2\left(\frac{f-1}{T}\right) df +$$

$$1 - \frac{2}{T K_{x(t)}} \int_{-\frac{1+\alpha}{2}}^{\frac{1+\alpha}{2}} X^2\left(\frac{f}{T}\right) \cos\left(2\pi f \frac{\epsilon}{T}\right) df$$

A pulse with the finite time domain ideally has an infinite frequency bandwidth. However, the general transmitting/receiving system does not allow a signal of the infinite frequency bandwidth to be passed. In this instance, the method for filtering the infinite frequency bandwidth signal is variable by the system.

Therefore, the subsequent assumption is needed so as to induce Equation 6 from Equation 5. That is, when a roll-off factor (=normalized excess bandwidth) is denoted by $\alpha$, it will be assumed that the frequency bandwidth signal of $$\left[-\frac{1+\alpha}{2T}, \frac{1+\alpha}{2T}\right]$$

is passed and the signals outside the corresponding area are eliminated. Therefore, the operation H(f) at the channel filter 103 of FIG. 1 is assumed as expressed in Equation 7.

$$H(f) = \begin{cases} 1, & |f| \leq \frac{1+\alpha}{2T} \\ 0, & \text{elsewhere} \end{cases} \quad \text{(Equation 7)}$$

Equation 6 is induced under the assumption of Equation 7, and it is possible in the present invention to compute the normalized MSE of the receive symbol when another type of channel filter 101 is given.

As expressed in Equation 6, when the function for finding the normalized MSE of the receive symbol is induced to be the function of $w_k$ regarding the error $\epsilon$ of the symbol timing, the $w_k$ is used for minimizing the normalized MSE by using the repetitive algorithm of Equation 8.

1) Initialize $w_k = w_k^{(0)}$ for $k = 0, 1, \ldots, K$ and set $i = 0$,  (Equation 8)

2) Update $w_k$ as $w_k = w_k^{(i+1)}$ by $w_k^{(i+1)} = w_k^{(i)} - \mu \partial J(w_0^{(i)}, w_1^{(i)}, \ldots, w_K^{(i)})/\partial w_k$ 3) Compute $\Delta J \triangleq J(w_0^{(i+1)}, w_1^{(i+1)}, \ldots, w_K^{(i+1)}) - J(w_0^{(i)}, w_1^{(i)}, \ldots, w_K^{(i)})$.

If $\Delta J$ is negligible, then stop.

Otherwise, increase $i$ by 1 and go to step (2).

Here, $\mu$ represents the step size for updating the weight coefficient $w_k$ each time, and $\partial J(w_0^{(i)}, w_1^{(i)}, \ldots, w_K^{(i)})/\partial w_k$ indicates the partial derivative function for the normalized MSE ($J(w_0, w_1, \ldots, w_K)$) of the receive symbol. That is, the updated weight coefficient $w_k^{(i+1)}$ is generated by subtracting $\mu$ times the partial derivative function for the normalized MSE ($J(w_0, w_1, \ldots, w_K)$) of the receive symbol from the current weight coefficient $w_k^{(i)}$.

The initial weight coefficient $w_k^{(0)}$ can have various values, and the convergence value $w_k$ can be changed according to the initial weight coefficient. Therefore, in the exemplary embodiment of the present invention, it has the square-root raised-cosine function value during a predetermined time interval ([−LT/2, LT/2]), and it selects the Fourier series coefficient of the periodic function as the initial weight coefficient during the other interval.

Table 1 shows the weight coefficients $w_k$ induced by Equation 8 when the symbol timing errors are $\epsilon=0$, $\epsilon=0.05$ T, $\epsilon=0.1$ T, and $\epsilon=0.2$ T assuming that K=8, $\alpha=0.35$, and L=1.

TABLE 1

|  | $\epsilon_o/T = 0$ (New$_0$) | $\epsilon_o/T = 0.05$ (New$_{0.05}$) | $\epsilon_o/T = 0.1$ (New$_{0.1}$) | $\epsilon_o/T = 0.2$ (New$_{0.2}$) |
|---|---|---|---|---|
| $w_0$ | 0.090905 | 0.090330 | 0.089290 | 0.087338 |
| $w_1$ | 0.181815 | 0.181638 | 0.181355 | 0.177557 |
| $w_2$ | 0.181820 | 0.180264 | 0.177767 | 0.172108 |
| $w_3$ | 0.181813 | 0.182026 | 0.180519 | 0.172779 |
| $w_4$ | 0.180420 | 0.159828 | 0.153893 | 0.153677 |
| $w_5$ | 0.157399 | 0.127840 | 0.133558 | 0.144212 |
| $w_6$ | 0.091012 | 0.130182 | 0.127093 | 0.130495 |
| $w_7$ | 0.022461 | 0.087115 | 0.101565 | 0.115328 |
| $w_8$ | −0.002482 | 0.021302 | 0.028395 | 0.028618 |

Figure 2:
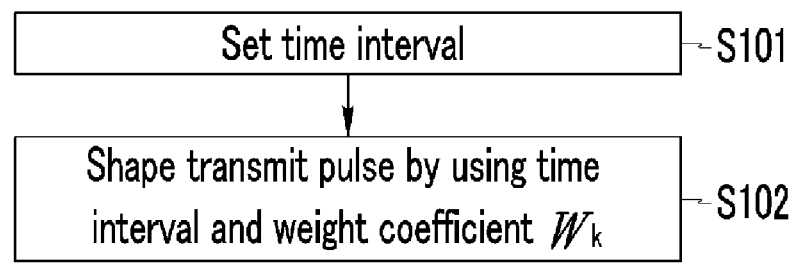
FIG. 2 shows a flowchart of a pulse shaping method according to an exemplary embodiment of the present invention.

FIG. 2 shows a flowchart of a pulse shaping method according to an exemplary embodiment of the present invention, illustrating a transmit pulse shaping method.

Referring to FIG. 2, the transmitting/receiving system sets a time interval so as to shape the transmit pulse (S101). The transmit pulse shaping filter 101 shapes a transmit pulse and outputs the same by applying Equation 1 and Equation 2 during the predetermined time interval (S102). Here, the function for shaping the transmit pulse is acquired by multiplying the K cosine functions $$\left(\cos\left(\frac{2\pi kt}{LT}\right)\right)$$

with different periods (LT/k) by the corresponding parameters ($v_k$) within the predetermined time interval when the time interval is [−LT/2, LT/2], and it becomes the pulse of 0 in other time intervals. The value $v_k$ is generated by using the weight coefficient ($w_k$). The weight coefficient ($w_k$) is generated so that the transmit pulse may be optimally shaped during the predetermined time interval, and in the exemplary embodiment of the present invention, the normalized MSE is generated so as to generate the weight coefficient, and the normalized MSE is applied to Equation 8 to compute and generate the weight coefficient ($w_k$) so that the transmit pulse may be optimally shaped during the predetermined time interval.

The optimized weight coefficient ($w_k$) is transmitted to the transmit pulse shaping filter 101, and the transmit pulse shaping filter 101 generates a transmit pulse by applying the optimized weight coefficient ($w_k$) to Equation 2. Also, the receive filter 104 is shaped by using it.

Table 2 and Table 3 show performance comparison between the case in which the existing square-root Nyquist pulse is cut by [−LT/2, LT/2] L=11 to be used as a transmit pulse and a receive filter response and the case in which the pulse generated according to the exemplary embodiment of the present invention is used as a transmit pulse and a receive pulse response. Table 2 show comparison of the normalized MSE (MSE/E$_s$) of the receive symbol in the assumption that there is no additive white Gaussian noise (AWGN), and Table 3 shows comparison of symbol error probability when the signal-to-noise ratio (SNR) is 15 dB and the binary phase shift key (BPSK) is used.

TABLE 2

|  | $\epsilon/T = 0$ | $\epsilon/T = 0.05$ | $\epsilon/T = 0.1$ | $\epsilon/T = 0.2$ |
|---|---|---|---|---|
| RC | 2.1418e−5 | 4.5438e−3 | 1.8343e−2 | 7.7291e−2 |
| BTRC | 1.0119e−4 | 3.3948e−3 | 1.3688e−2 | 6.0631e−2 |
| SECH | 3.1062e−4 | 3.3723e−3 | 1.2998e−2 | 5.7660e−2 |
| POLY | 7.2748e−4 | 3.4826e−3 | 1.2228e−2 | 5.3930e−2 |
| DJ | 1.9890e−3 | 4.3803e−3 | 1.2090e−2 | 5.0423e−2 |
| New$_0$ | 1.2664e−8 | 5.0180e−3 | 2.0283e−2 | 8.4260e−2 |
| New$_{0.05}$ | 2.0565e−4 | 2.7923e−3 | 1.1064e−2 | 5.1319e−2 |
| New$_{0.1}$ | 1.3025e−3 | 3.4011e−3 | 1.0276e−2 | 4.5883e−2 |
| New$_{0.2}$ | 1.2147e−2 | 1.3017e−2 | 1.6379e−2 | 4.0398e−2 |

TABLE 3

|  | $\epsilon/T = 0$ | $\epsilon/T = 0.05$ | $\epsilon/T = 0.1$ | $\epsilon/T = 0.2$ |
|---|---|---|---|---|
| RC | 9.4789e−9 | 6.0829e−8 | 1.4107e−6 | 3.9612e−4 |
| BTRC | 1.0022e−8 | 4.2650e−8 | 5.9744e−7 | 1.1284e−4 |
| SECH | 1.1330e−8 | 4.3704e−8 | 5.3607e−7 | 8.7391e−5 |
| POLY | 1.4182e−8 | 4.8014e−8 | 5.0563e−7 | 7.0439e−5 |
| DJ | 2.6511e−8 | 7.4305e−8 | 6.5155e−7 | 7.7470e−5 |
| New$_0$ | 9.3753e−9 | 7.1449e−8 | 2.0640e−6 | 6.6199e−4 |
| New$_{0.05}$ | 1.2105e−8 | 4.0691e−8 | 4.7759e−7 | 8.3613e−5 |
| New$_{0.1}$ | 2.2597e−8 | 5.6698e−8 | 4.8590e−7 | 6.2893e−5 |
| New$_{0.2}$ | 7.0786e−7 | 8.1244e−7 | 1.7290e−6 | 6.2084e−5 |

Referring to Table 2 and Table 3, the pulse shaping method according to the exemplary embodiment of the present invention produces the best performance for the given symbol timing error ($\epsilon$/T). In general, the overall performance of the transmitting/receiving system depends on the performance in the worst condition. Hence, as shown in Table 2 and Table 3, the pulse shaping method according to the exemplary embodiment of the present invention has the advantage of designing the pulses with improved performance for the limited resource (finite time interval of the pulse) of the transmitting/receiving system.

According to the embodiments of the present invention, it is possible to design a pulse with improved performance for an established finite time interval.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for shaping a pulse used as a transmit pulse and a receive filter response, comprising:
    setting first time interval for shaping a pulse; and
    outputting a pulse with a first value, which is generated by multiplying a first parameter, generated based on a weight coefficient, by each of a plurality of cosine functions with different periods and summing the multiplication of the first parameter with each of the plurality of cosine functions with different periods, in the first time interval, and
    outputting a pulse with a second value in a second time interval other than the first time interval,
    wherein in the outputting of the pulse with the first value,
    when the first time interval includes L symbols with a symbol interval of T, a plurality of cosine functions respectively have a period of LT/k,
    where k represents a variable changeable from 0 to K according to a corresponding cosine function, K represents the number of cosine functions except a function with a frequency of 0, and when k is given as 0, the corresponding cosine function has a constant during the first time interval,
    wherein in the outputting of the pulse with the first value,
    the first parameter is generated by dividing the weight coefficient by the first function, and
    the first function is generated by multiplying each of the plurality of cosine functions by the corresponding weight coefficient, summing the multiplication of each of the plurality of cosine functions by the corresponding weight coefficient, squaring the sum, and integrating the squared value for the first time interval.

2. The method of claim 1, wherein the method further includes
    generating the weight coefficient,
    wherein the generating of the weight coefficient includes:
    setting an initial value of the weight coefficient;
    generating a normalized mean squares error (MSE) corresponding to the pulse with the first value; and
    continuously updating the weight coefficient based on the normalized MSE and generating a finally optimized weight coefficient.

3. The method of claim 2, wherein
the generating of the finally optimized weight coefficient includes:
    acquiring a (k+1)-th weight coefficient by subtracting a value that is generated by multiplying the normalized MSE by a constant and applying a partial derivative function to the multiplied MSE from a k-th weight coefficient; and
    acquiring the weight coefficient as an optimized weight coefficient by repeatedly acquiring the (k+1)-th weight coefficient until the (k+1)-th weight coefficient is no longer changed while increasing k,
    wherein k is increased from 0 by 1.

* * * * *